United States Patent
Wu et al.

(10) Patent No.: US 10,977,327 B2
(45) Date of Patent: Apr. 13, 2021

(54) METHOD FOR GENERATING AGGREGATED CONTENT, TERMINAL, AND MEDIUM

(71) Applicant: BAIDU ONLINE NETWORK TECHNOLOGY (BEIJING) CO., LTD., Beijing (CN)

(72) Inventors: Zhun Wu, Beijing (CN); Lili Zhai, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 189 days.

(21) Appl. No.: 16/232,272

(22) Filed: Dec. 26, 2018

(65) Prior Publication Data
US 2019/0286674 A1    Sep. 19, 2019

(30) Foreign Application Priority Data
Mar. 19, 2018 (CN) .......................... 201810225567.7

(51) Int. Cl.
*G06F 16/9535* (2019.01)
*G06F 16/955* (2019.01)
(Continued)

(52) U.S. Cl.
CPC ...... *G06F 16/9535* (2019.01); *G06F 16/9538* (2019.01); *G06F 16/9558* (2019.01); *G06Q 10/10* (2013.01); *G06Q 30/0241* (2013.01)

(58) Field of Classification Search
CPC .............. G06F 3/04817; G06F 16/735; G06F 3/04842; G06F 30/00; G06F 15/16; G06F 9/451
(Continued)

(56) References Cited

U.S. PATENT DOCUMENTS

2011/0106840 A1* 5/2011 Barrett .................. G06Q 30/02
707/769

FOREIGN PATENT DOCUMENTS

| CN | 106294730 A | 1/2017 |
|----|-------------|--------|
| JP | 2011170611 A | 9/2011 |

(Continued)

OTHER PUBLICATIONS

Templatemonster: (OpenCart 2. How To Manage Related Products (Feb. 7, 2017) (Explain the document in the video as link https://www.youtube.com/watch?v=AZ7w0lx4Zik).*
(Continued)

*Primary Examiner* — Hung T Vy
(74) *Attorney, Agent, or Firm* — Lathrop GPM LLP

(57) ABSTRACT

The present disclosure provides a method for generating aggregated content, a terminal, and a medium. The method includes: providing a user interface for displaying a list of pieces of content; obtaining at least two pieces of content chosen by an aggregating user from the list; receiving a content aggregating request input by the aggregating user on the user interface; combining the at least two pieces of content based on the content aggregating request, to obtain the aggregated content; and uploading the aggregated content to a server based on an updating request input by the aggregating user on the user interface. The aggregated content is configured as recommendation content to provide for other users by the server.

18 Claims, 10 Drawing Sheets obtaining at least two pieces of content chosen by an aggregating user as at least two items of recommendation content to be aggregated — S110 combining the at least two items of recommendation content to be aggregated based on a content aggregating request of the aggregating user, to obtain the aggregated content, and uploading the aggregated content to a server; in which, the aggregated content is configured as recommendation content to provide for other users by the server — S120

(51) Int. Cl.
*G06F 16/9538* (2019.01)
*G06Q 30/02* (2012.01)
*G06Q 10/10* (2012.01)

(58) Field of Classification Search
USPC .......................................................... 707/722
See application file for complete search history.

(56) References Cited

FOREIGN PATENT DOCUMENTS

| | | | |
|---|---|---|---|
| JP | 2013513140 | A | 4/2013 |
| KR | 20010057067 | A | 7/2001 |
| KR | 20110074053 | A | 6/2011 |
| KR | 101530122 | B1 | 6/2015 |
| KR | 20150144889 | A | 12/2015 |

OTHER PUBLICATIONS

European Patent Application No. 18214494.9, extended Search and Opinion dated Jun. 18, 2019, 9 pages.
Templatemonster: "OpenCart 2. How To Manage Related Products" Retrieved Jun. 4, 2019 from the Internet: https://www.youtube.com/watch?v=AZ7w0lx4Zik, 4 pages.
Korean Patent Application No. 10-2018-0121024, Office Action dated Nov. 11, 2019, 9 pages.
Korean Patent Application No. 10-2018-0121024, English translation of Office Action dated Nov. 11, 2019, 9 pages.
Instagram push notification setting method; Aug. 25, 2017, SNS Marketing https://blog.naver.com/gritarmg/221082079056; 7 pages.
Japanese Patent Application No. 2018-201854, Office Action dated Oct. 8, 2019, 4 pages.
Japanese Patent Application No. 2018-201854, English translation of Office Action dated Oct. 8, 2019, 4 pages.
Proposal and Implementation of a Personalized Information System that Integrates Push-style and Pull-style WWW Access; Information Processing Society, May 15, 1998, vol. 39, No. 5, pp. 1514 to 1522.
Instagram push notification setting method; Aug. 25, 2017, SNS Marketing https://blog.naver.com/gritarmg/221082079056; English translation, 6 pages.
Chinese Patent Application No. 201810225567.7, First Office Action dated Apr. 20, 2020, 6 pages.
Chinese Patent Application No. 201810225567.7, English translation of First Office Action dated Apr. 20, 2020, 8 pages.

\* cited by examiner

METHOD FOR GENERATING AGGREGATED CONTENT, TERMINAL, AND MEDIUM

CROSS-REFERENCE TO RELATED APPLICATION

This application claims priority to Chinese Patent Application No. 201810225567.7, filed on Mar. 19, 2018, the entire content of which is incorporated herein by reference for all purposes.

FIELD

The present disclosure relates to the field of information processing technologies, and more particularly to a method and a device for generating aggregated content, a method and a device for pushing aggregated content, a terminal, a server and a medium.

BACKGROUND

At present, various content recommendations may be present in various APPs (Applications) or built-in application software of a terminal. Content recommendation functions may provide a user with rich web content. Some content recommendation functions may continuously provide the user with content based on his/her personalized needs.

SUMMARY

In the first aspect, embodiments of the present disclosure provide a method for generating aggregated content, including: providing a user interface for displaying a list of pieces of content; obtaining at least two pieces of content chosen by an aggregating user from the list; receiving a content aggregating request input by the aggregating user on the user interface; combining the at least two pieces of content based on the content aggregating request, to obtain the aggregated content; and uploading the aggregated content to a server based on an updating request input by the aggregating user on the user interface, wherein, the aggregated content is configured as recommendation content to provide for other users by the server.

In the second aspect, embodiments of the present disclosure further provide a terminal, including: one or more processors and a storage device. The storage device is configured to store one or more programs. When the one or more programs are executed by the one or more processors, the one or more processors implement the above method for generating aggregated content.

In the third aspect, embodiments of the present disclosure further provide a computer storage medium having stored computer programs thereon. The programs are configured to be executed by a processor to implement the above method for generating aggregated content.

DETAILED DESCRIPTION

Figure 1:
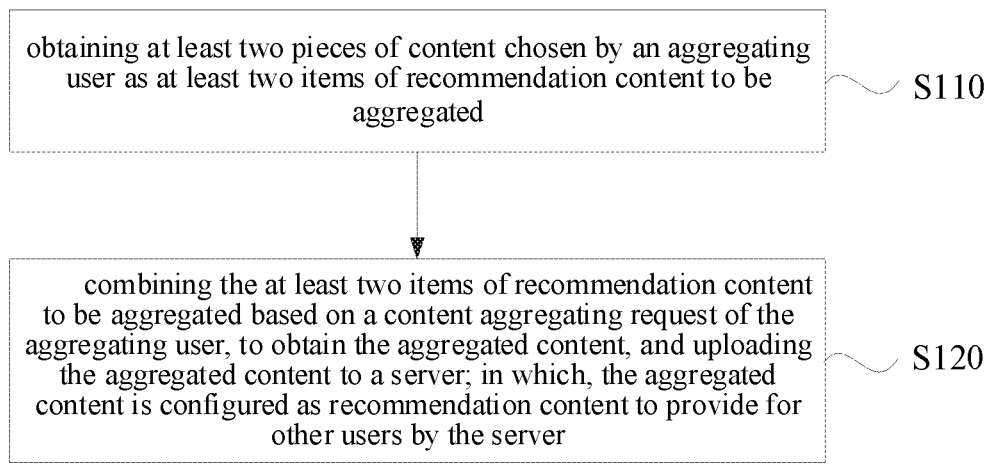
FIG. 1 is a flow chart illustrating a method for generating aggregated content provided in embodiment one of the present disclosure.

Description will be made in detail below to the present disclosure with reference to the embodiments and the drawings. It should be understood that, detailed embodiments described herein are intended only to explain the present disclosure, and are not limited to the present disclosure.

In addition, it should be noted that, for the convenience of description, only some but not all of the contents related to the present disclosure are illustrated in the drawings. Before discussing exemplary embodiments in more detail, it should be mentioned that, some exemplary embodiments are described as the processing or method described by the flow charts. Although the flow charts describe various operations (or S) as sequential processing, many of the operations can be implemented in parallel, concurrently, or simultaneously. In addition, the sequence of operations may be rearranged. The processing may be terminated when the operation is completed, but may further have additional S not included in the drawing. The processing may correspond to methods, functions, procedures, subroutines, subprograms and the like.

Embodiment One

FIG. 1 is a flow chart illustrating a method for generating aggregated content provided in embodiment one of the present disclosure. The embodiment may be applicable to a case that the aggregated content is formed based on pieces of obtained content. The method may be executed by a device for generating aggregated content. The device may be implemented in form of hardware and/or software, and usually may be integrated in a terminal. The device is used in conjunction with a server, for completing a recommendation function of aggregated content. The method includes actions in the following blocks.

In block S110, at least two pieces of content chosen by an aggregating user are obtained as at least two items of recommendation content to be aggregated.

The aggregating user is one who aggregates and shares various content. The aggregating user may obtain related content through related APPs of the terminal or through other ways. For example, the aggregating user may continuously obtain various content of standard format by Feed stream in the terminal. The various content of standard format is provided for satisfying the aggregating user's needs. The Feed stream is a format. The website may spread the latest content to the user in the form of a list by the Feed stream, which enables the user to receive various content faster and more efficiently. The piece of content is one selected from many pieces of content. The at least two items of recommendation content to be aggregated are the at least two pieces of content chosen based on the aggregating user's needs. It should be noted that, the recommendation content to be aggregated may include different types of content corresponding to a plurality of interest dimensions of the aggregating user. Of course, the recommendation content to be aggregated also may include a plurality of pieces of content corresponding to an interest dimension of the aggregating user. Respective piece of content included in the recommendation content to be aggregated may be decided by the aggregating user.

In embodiments of the present disclosure, the aggregating user may choose a plurality of pieces of content in the APPs of the terminal or in various applications (such as browsers) built in the terminal. In addition, the aggregating user also may obtain various pieces of content by other ways. Embodiments of the present disclosure do not limit to ways that the aggregating user obtains the pieces of content.

In block S120, the at least two items of recommendation content to be aggregated are combined based on a content aggregating request of the aggregating user, to obtain the aggregated content, and the aggregated content is uploaded to a server. The aggregated content is configured as recommendation content to provide for other users by the server.

The content aggregating request is sent by the aggregating user. The content aggregating request is a request configured to aggregate the plurality of pieces of content chosen by the aggregating user. The aggregated content includes a plurality of items of recommendation content to be aggregated. The plurality of items of recommendation content to be aggregated is chosen by the aggregating user. The aggregated content may be configured by the server to provide for other users.

In embodiments of the present disclosure, the aggregating user may aggregate the at least two pieces of content which he/she is interested in, to form the aggregated content, and send the aggregated content to the server, such that the server takes the aggregated content as recommendation content to recommend to other users. This way for recommending content may satisfy a precipitation user's need (the precipitation user is one who pursues content that contains knowledge of the depth and breadth) for depth content. For example, when the aggregating user is a professional in a certain technical field, other skilled in this field may keep up to latest dynamic or related technical knowledge in time by the aggregated content arranged daily by the aggregating user. When the aggregating user is a star, fans of the star may know about the star's preferences, dynamics and attention hotspots, etc. by the aggregated content organized by the star. Other users do not need to actively search the attention hotspot of the aggregating user, and may directly know about attention dynamics of the aggregating user in time by the aggregated content of the aggregating user, which is recommended by the server, to bring certain commercial value to the aggregating user by the aggregated content.

In an alternative embodiment of the present disclosure, before obtaining the at least two pieces of content chosen by the aggregating user as the at least two items of recommendation content to be aggregated, the method further includes: obtaining description text of at least one piece of content from the server to provide for the aggregating user; providing a piece of content matching with a content viewing request of the aggregating user from the at least one piece of content, and providing a content adding option corresponding to the piece of content matching with the content viewing request in a content display webpage. The content adding option is configured to trigger choosing the piece of content matching with the content viewing request as one item of recommendation content to be aggregated.

The description text may be title information of the piece of content, content introduction and the like. All texts that may describe core content of the piece of content may be as the description text. The description text may display the core content of the piece of content to the aggregating user in form of keyword or key sentence, such that the aggregating user quickly browses and locates the piece of content that he/she is interested in from a plurality of pieces of content. The content viewing request may be generated by that the aggregating user clicks the corresponding piece of content or by that the aggregating user inputs instructions by speech. The content display webpage is one for displaying the piece of content matching with the content viewing request, including all contents of the piece of content matching with the content viewing request. The adding option may be designed at the corresponding location of the content display webpage based on detailed need, for example, at a bottom right corner of the content display webpage, etc.

In embodiments of the present disclosure, the terminal may obtain various types of content from the server, for example, news, entertainment content, social content, popular science content and other academic content, etc. The aggregating user may quickly locate the piece of content that he/she is interested in by browsing the description text of respective type of content, and send the content viewing request for the piece of content that he/she is interested in by clicking the piece of content or inputting speech. The server may send all contents containing the piece of matched content to the terminal by the content display webpage according to the content viewing request obtained and then the terminal displays all the contents. The aggregating user views the piece of content by the content display webpage, and decides whether to take the piece of content as the recommendation content to be aggregated by the adding option based on his/her needs.

In an alternative embodiment of the present disclosure, before obtaining the at least two pieces of content chosen by the aggregating user as the at least two items of recommendation content to be aggregated, the method further includes: obtaining a piece of content matching with a webpage link input by the aggregating user from the server; providing the piece of content matching with the webpage link for the aggregating user, and providing a content adding option corresponding to the piece of content matching with the webpage link in a content display webpage; in which, the content adding option is configured to trigger choosing the piece of content matching with the webpage link as one item of recommendation content to be aggregated.

In embodiments of the present disclosure, the aggregating user may directly obtain related content from the pieces of content provided by the server, and further may copy a link of the related content when he/she uses other APPs in the terminal to read some content (the function of an adding option may be not designed in the content display webpages in other APPs). The server may recognize the link copied by the aggregating user, and automatically search for and collect the piece of content matching with the webpage link in massive content. The server provides the piece of content collected for the aggregating user, and the aggregating user may filter a piece of content that he/she is interested in as the recommendation content to be aggregated. The processing of obtaining, collecting and providing the piece of content may be completed by the server, which does not need interference of an editor, such that problems of high labor cost, low efficiency and poor timeliness in the existing content recommendation function are solved. In the meantime, collection of the piece of content may be completed by the server through the corresponding algorithm, which may effectively avoid the limitations when the editor collects content in the subjective bias, such that the rationality of interest localization of the aggregating user is fully guaranteed.

With the embodiments of the present disclosure, by obtaining the at least two pieces of content chosen by the aggregating user as the at least two items of recommendation content to be aggregated, combining the at least two items of recommendation content to be aggregated based on the content aggregating request of the aggregating user to obtain the aggregated content, and uploading the aggregated content to the server, some problems in the existing content recommendation such as labor cost, low efficiency, poor timeliness and limitation are solved. The aggregated content in time is recommended for the user from a plurality of interest dimensions, which extends dimensions of content, improves efficiency and timeliness of content recommendation, reduces labor cost, breaks through limitation caused by manually collecting content, and enhances commercial value.

Embodiment Two

Figure 2A:
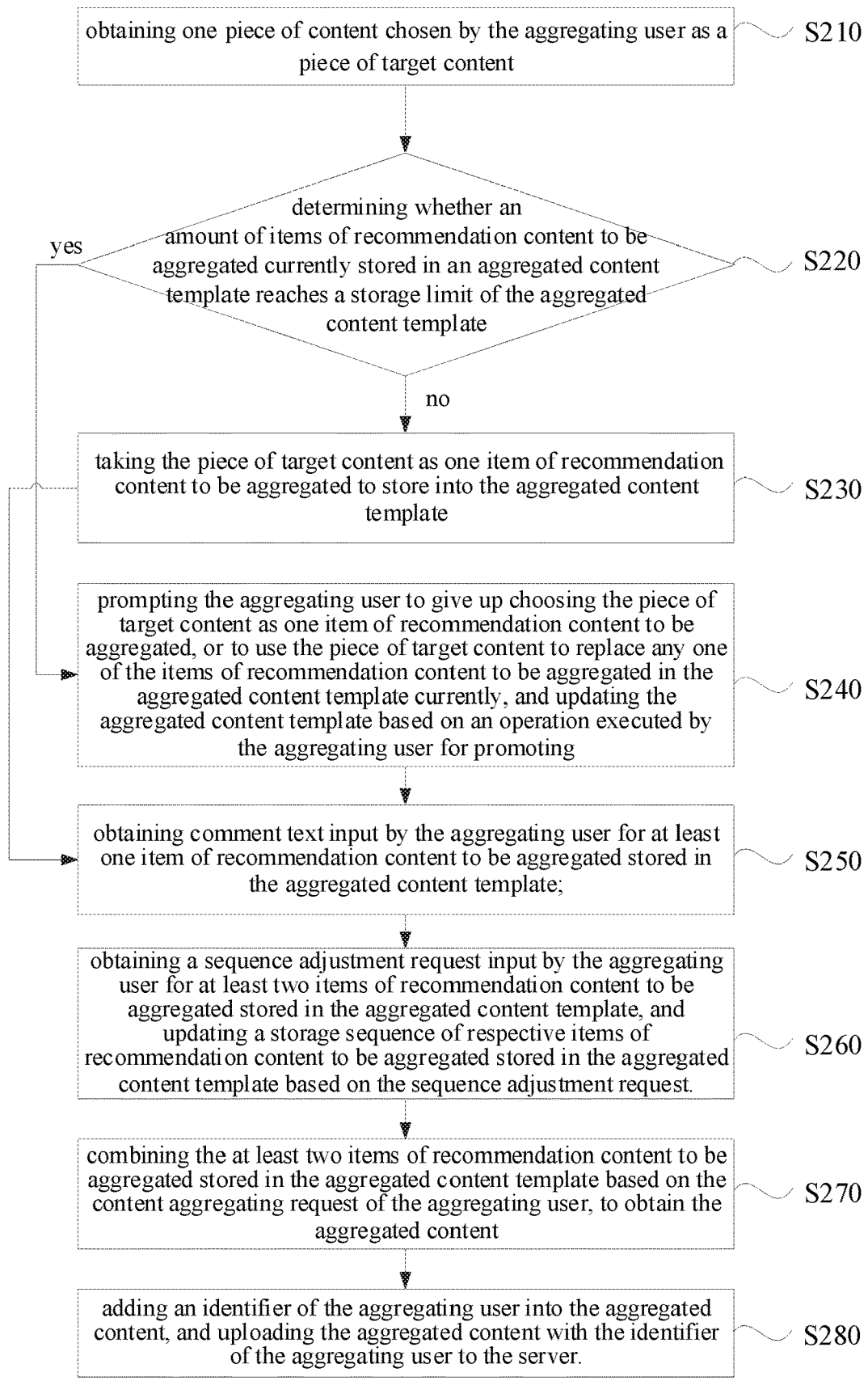
FIG. 2a is a flow chart illustrating a method for generating aggregated content provided in embodiment two of the present disclosure.

FIG. 2a is a flow chart illustrating a method for generating aggregated content provided in embodiment two of the present disclosure. The embodiment is specified on the basis of the above embodiment one. In embodiments of the present disclosure, obtaining the at least two pieces of content chosen by the aggregating user as the at least two items of recommendation content to be aggregated includes: obtaining one piece of content chosen by the aggregating user as a piece of target content; determining an amount of items of recommendation content to be aggregated currently stored in an aggregated content template; when the amount of items of recommendation content does not reach a storage limit of the aggregated content template, taking the piece of target content as one item of recommendation content to be aggregated to store into the aggregated content template; when the amount of items of recommendation content reaches the storage limit of the aggregated content template, prompting the aggregating user to give up choosing the piece of target content as one item of recommendation content to be aggregated, or to use the piece of target content to replace any one of the items of recommendation content to be aggregated stored in the aggregated content template currently, and updating the aggregated content template based on an operation executed by the aggregating user for promoting. Accordingly, the method of the embodiment may include actions in the following blocks.

In block S210, one piece of content chosen by the aggregating user is obtained as a piece of target content.

In embodiments of the present disclosure, considering reading experience of the user, the amount of the pieces of content in the aggregated content is limited. Therefore, the aggregating user does not choose the pieces of content as the recommendation content to be aggregated without limitation. It needs to be determined in time whether the piece of chosen content may be as the recommendation content to be aggregated.

In block S220, it is determined whether an amount of items of recommendation content to be aggregated currently stored in an aggregated content template reaches a storage limit of the aggregated content template. If no, the action in block S230 is executed; if yes, the action in block S240 is executed.

The aggregated content template is configured to store the recommendation content to be aggregated. A storage limit of items of recommendation content to be aggregated stored in the aggregated content template may be 3, 5, or another positive integer value. The storage limit may be provided based on the actual need, which is not limited in embodiments of the present disclosure.

Accordingly, it first needs to determine whether the amount of pieces of content that have been stored in the aggregated content template reaches the storage limit of items of recommendation content to be aggregated when it is determined whether the piece of target content may be as the item of recommendation content to be aggregated.

In block S230, the piece of target content is taken as one term of the recommendation content to be aggregated to store in the aggregated content template, and then the action in block S250 is executed.

In detail, when it is determined whether the piece of target content may be taken as one term of the recommendation content to be aggregated, if the amount of items of recommendation content currently in the aggregated content template does not reach the storage limit of the aggregated content template, that is, the aggregated content template further may contain the piece of target content, the piece of target content is taken as the item of recommendation content to be aggregated to store in the aggregated content template.

In block S240, the aggregating user is prompted to give up choosing the piece of target content as one item of recommendation content to be aggregated, or to use the piece of target content to replace any one of the items of recommendation content to be aggregated stored in the aggregated content template currently, and the aggregated content template is updated based on an operation executed by the aggregating user for promoting. And then the action in block S250 is executed.

In detail, when it is determined whether the piece of target content may be taken as one term of the recommendation content to be aggregated, if the amount of items of recommendation content currently in the aggregated content template reaches the storage limit of the aggregated content template, the aggregating user may be promoted whether to give up adding the piece of current target content based on the actual needs. Or, the aggregating user may be promoted to use the piece of current target content to replace any one of the items of recommendation content to be aggregated stored in the aggregated content template.

In block S250, comment text input by the aggregating user for at least one item of recommendation content to be aggregated stored in the aggregated content template is obtained The comment text may be the text that the aggregating user inputs through a plurality of forms such as characters, expressions, pictures, speech and video for the piece of content. The comment text may reflect suggestions and opinions of the aggregating user for the piece of content, such that other user further may know about the understanding and awareness of the aggregating user for the certain piece of content when the aggregated content is recommended to other users.

In embodiments of the present disclosure, the aggregating user may input comment text for the piece of content when browsing the piece of content. If the aggregating user inputs comment text for the term of recommendation content to be aggregated, the aggregated content template may put the term of recommendation content to be aggregated with the comment text in front acquiescently, such that other users obtain the comment text of the aggregating user fast when browsing the aggregated content.

In block S260, a sequence adjustment request input by the aggregating user for at least two items of recommendation content to be aggregated stored in the aggregated content template is obtained, and a storage sequence of respective item of recommendation content to be aggregated in the aggregated content template is updated based on the sequence adjustment request.

The sequence adjustment request is sent by the aggregated user. The sequence adjustment request is configured to perform sequence adjustment on the items of recommendation content to be aggregated in the aggregated content template. The sequence adjustment request may be obtained by that the aggregating user drags the item of recommendation content to be aggregated in the aggregated content template or by that the aggregating user inputs speech. For example, the second item of recommendation content to be aggregated is adjusted to a position where the first item of recommendation content to be aggregated is by a speech "adjusting the second item to the first item".

In embodiments of the present disclosure, the storage sequence of the items of recommendation content to be aggregated in the aggregated content template is adjusted by the sequence adjustment request, and the content which the aggregating user thinks is more important may be put in the front of the aggregated content, to satisfy the need that a precipitation user obtains the content.

It should be noted that, embodiments of the present disclosure do not limit to the sequence of block S250 and block S260. Simultaneously, one of block S250 and block S260 may be chosen to execute. Block S250 and block S260 may further be combined into one embodiment to execute a method for adjusting the storage sequence of the items of recommendation content to be aggregated.

In block S270, the at least two items of recommendation content to be aggregated stored in the aggregated content template is combined based on the content aggregating request of the aggregating user, to obtain the aggregated content.

In detail, after adjusting the storage sequence of the items of recommendation content to be aggregated in the aggregated content template, the aggregating user may send the content aggregated request, to aggregate the items of recommendation content to be aggregated.

In block S280, an identifier of the aggregating user is added into the aggregated content, and the aggregated content with the identifier of the aggregating user is uploaded to the server.

The identifier may be configured to uniquely determine the identity of the aggregating user. For example, the identifier may be: account information registered under the setting platform, a mobile phone number or a terminal device number. A corresponding relationship between the aggregating user and the aggregated content may be established by adding the identifier of the aggregating user to the aggregated content, such that related information of the aggregating user or other aggregated content provided by the aggregating user may be obtained when other users browse the aggregated content provided by the server.

Accordingly, after the terminal obtains the aggregated content aggregated by the aggregating user, the aggregated content may be added with the identifier of the aggregating user, and then the aggregated content with the identifier of the aggregating user is packaged, and finally the aggregated content packaged is uploaded to the server.

In addition, it should be noted that, if all users may issue or upload his/her aggregated content, large-data storage pressure and subsequent data-searching pressure may be brought to the server. Therefore, in an alternative implementation of the embodiment, the above function of generating the aggregated content may be only opened for some special account users, such as an opinion leader of the real-name authentication, a user whose attention exceeds a set number, a senior user in a set field or a baijia account in a Baidu phone assistant. By the foregoing setting, aggregated content sources are greatly improved, while the quantity and number of the aggregated content are well constrained and controlled.

Figure 2B:
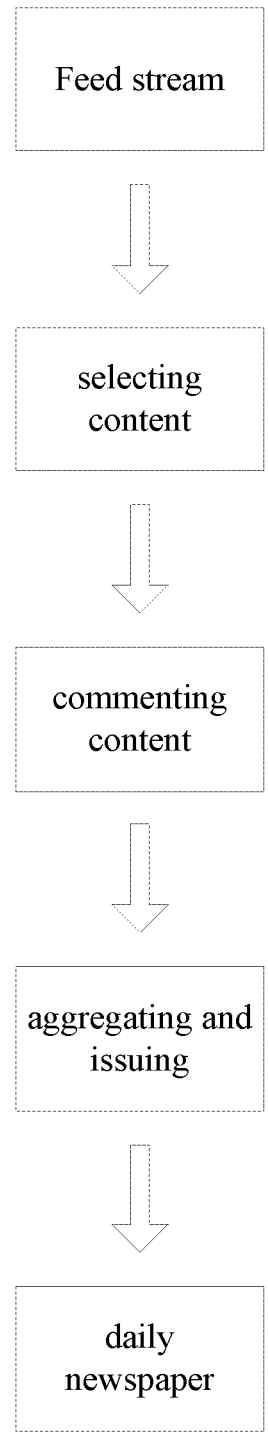
FIG. 2b is a schematic diagram illustrating a method for generating a daily newspaper provided in embodiment two of the present disclosure.

In embodiments of the present disclosure, alternatively, the aggregated content added with the identifier is named a daily newspaper. FIG. 2b is a schematic diagram illustrating a method for generating a daily newspaper provided in embodiment two of the present disclosure. As illustrated in FIG. 2b, the aggregating user may obtain many pieces of content by Feed stream, and some pieces of content are filtered from many pieces of content as some pieces of recommendation content to be aggregated. Simultaneously, the aggregating user may comment some pieces of recommendation content to be aggregated based on the aggregating user' need, and then aggregate and issue some pieces of recommendation content to be aggregated, to form the daily newspaper of the aggregating user.

It should be noted that, various APPs providing content in the related art allow a browsing user to comment the piece of content, and to view comment text of other users in a comment area. Therefore, in order to further distinguish the daily newspaper and other pieces of content, in embodiments, the browsing user may view the comment text of other users in the comment area normally when viewing a piece of content in a plurality of pieces of content provided by the Feed stream. If the browsing user views a piece of content aggregated in the daily newspaper of the aggregating user, the aggregating user's comment for the piece of content may be highlighted. For example, the comment is placed at the top of the piece of content or at the top of the comment area, such that the browsing user may know the attitude of the aggregating user for the piece of content, and the user's need for obtaining the content may further be satisfied.

With the embodiments of the present disclosure, the aggregating user arranges, updates and sorts the items of recommendation content to be aggregated in the latest aggregated content template, such that adjustment of pieces of content in the aggregated content is implemented, details of the aggregated content is more in-depth and personalized, thus satisfying the deep need of the precipitation user for the details of the aggregated content.

Embodiment Three

Figure 3:
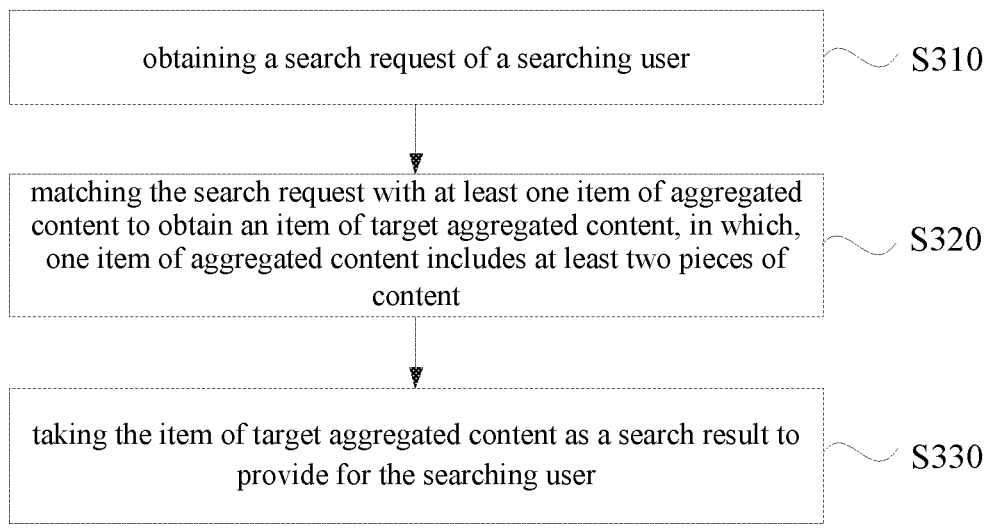
FIG. 3 is a flow chart illustrating a method for pushing aggregated content provided in embodiment three of the present disclosure.

FIG. 3 is a flow chart illustrating a method for pushing aggregated content provided in embodiment three of the present disclosure. The embodiment may be applicable to a case that the aggregated content is pushed to a user. The method may be executed by a device for pushing aggregated content. The device may be implemented in form of software and/or hardware, and may be integrated in a server. The device is used in conjunction with a terminal, for completing a recommendation function of aggregated content. The method includes actions in the following blocks.

In block S310, a search request of a searching user is obtained.

The searching user is one who browses a piece of content or the aggregated content generated by the aggregating user. The search request is input by the searching user based on his/her focus through APPs or other software in the terminal. The search request is configured to search related content. In embodiments of the present disclosure, the server obtains the search request of the searching user before providing the related content to the searching user.

In block S320, the search request is matched with at least one item of aggregated content to obtain an item of target aggregated content. One item of aggregated content includes at least two pieces of content.

In embodiments of the present disclosure, after obtaining the search request, the server may match the search request with the above aggregated content received and uploaded by the aggregating user through the terminal. When the aggregated content in the server is matched with the search request, this aggregated content may be as target aggregated content. It should be noted that, the target aggregated content may be the aggregated content aggregated by different aggregating users.

In block S330, the item of target aggregated content is taken as a search result to provide to the searching user.

Accordingly, after obtaining items of target aggregated content, the server may provide all items of target aggregated content to the searching user. The server may provide all items of target aggregated content in a descending order of correlations between each item of target aggregated content and the search request, and also provide all items of target aggregated content in other preset rules, which is not limited in embodiments of the present disclosure.

With the embodiments of the present disclosure, by providing the item of target aggregated content including the at least two pieces of content for the search request of the searching user, the content limitation problems resulting from the manual content collection, aggregation, and issuing of the editor in the related art are solved, improving efficiency and timeliness of content recommendation, reducing labor cost, breaking through limitation caused by manually collecting content, and enhancing commercial value.

Embodiment Four

Figure 4A:
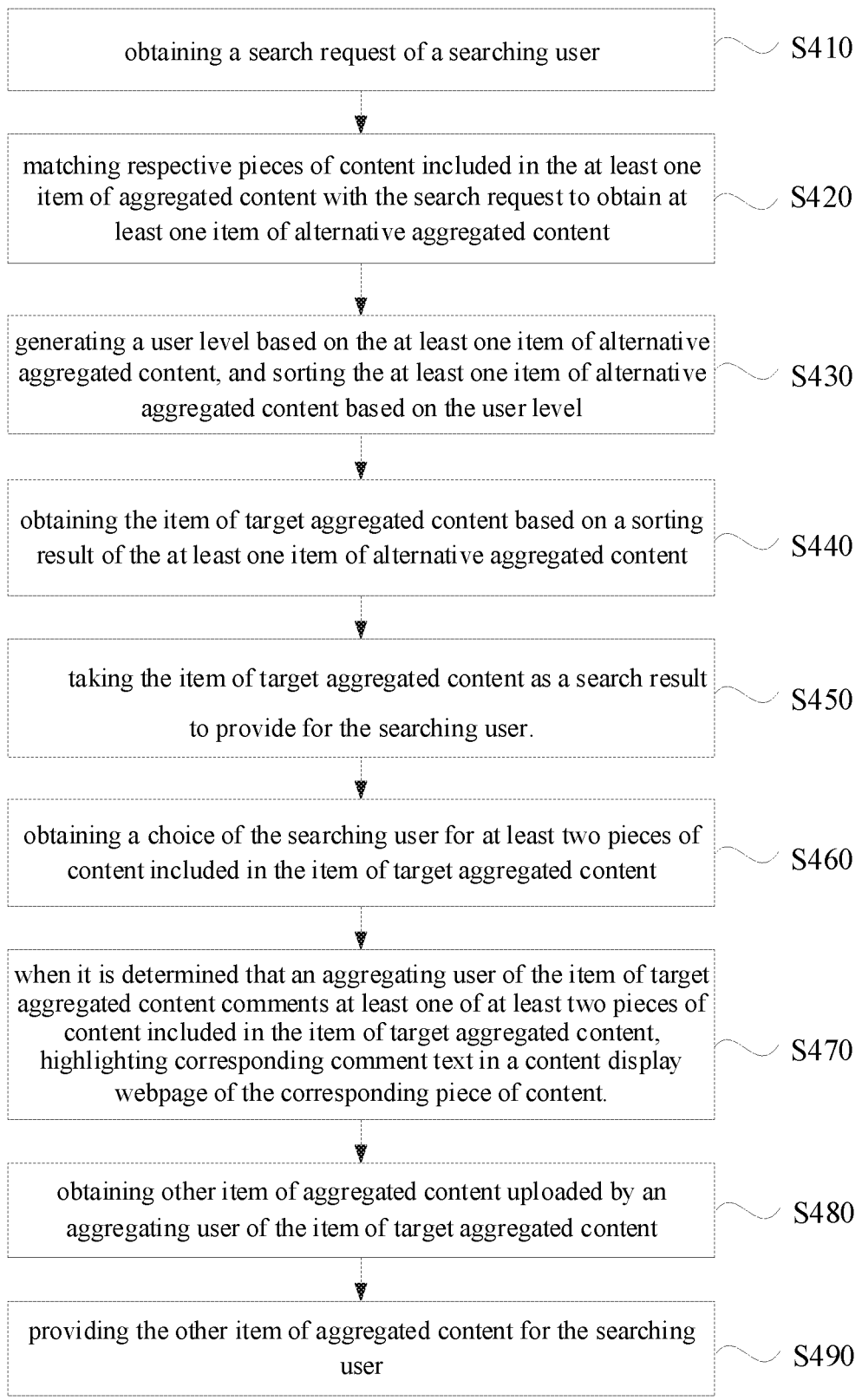
FIG. 4a is a flow chart illustrating a method for pushing aggregated content provided in embodiment four of the present disclosure.

FIG. 4a is a flow chart illustrating a method for pushing aggregated content provided in embodiment four of the present disclosure. The embodiment is specified on the basis of the above embodiment three. In embodiments of the present disclosure, matching the search request with the at least one item of aggregated content to obtain the item of target aggregated content includes: matching respective pieces of content included in the at least one item of aggregated content with the search request to obtain at least one item of alternative aggregated content; generating a user level based on the at least one item of alternative aggregated content, and sorting the at least one item of alternative aggregated content based on the user level; and obtaining the item of target aggregated content based on a sorting result of the at least one item of alternative aggregated content.

Accordingly, the method of the embodiment may include actions in the following blocks.

In block S410, the search request of the searching user is obtained.

In block S410, respective pieces of content included in the at least one item of aggregated content are matched with the search request to obtain at least one item of alternative aggregated content.

In embodiments of the present disclosure, since the item of aggregated content includes at least two pieces of content, and respective pieces of content in the item of aggregated content may belong to a same type or different types, all pieces of content included in the item of aggregated content may be matched one by one with the search request. As long as the at least one piece of content in the item of aggregated content matches with the search request, this item of aggregated content is taken as the item of alternative aggregated content.

In block S430, the user level is generated based on the at least one item of alternative aggregated content, and the at least one item of alternative aggregated content is sorted based on the user level.

The user level may be determined based on the social class of the aggregating user, an amount of users concerning the aggregating user, or an amount of items of aggregated content sent by the aggregating user. Setting of the user level may provide the item of quality aggregated content to the searching user.

In block S440, the item of target aggregated content is obtained based on the sorting result of the at least one item of alternative aggregated content.

Accordingly, after sorting the at least one item of alternative aggregated content based on the user level, the item of aggregated content after sorting is taken as the item of target aggregated content to provide to the searching user. For example, only the first three items of alternative aggregated content in the sorting result are taken as the items of target aggregated content. Therefore, it can be seen that, an item of more authoritative aggregated content may be intuitively provided to the searching user by sorting the at least one item of alternative aggregated content.

In block S450, the item of target aggregated content is taken as a search result to provide to the searching user.

In an alternative embodiment of the present disclosure, after taking the item of target aggregated content as the search result to provide to the searching user, the method further includes: providing a following option of an aggregating user corresponding to the item of target aggregated content to the searching user, in which the following option is configured to trigger the searching user to follow the aggregating user, to obtain aggregated content in real time uploaded by the aggregating user.

The following option is provided separately in a content view webpage. The following option is configured for the searching user to follow the aggregating user who he/she is interested in. Accordingly, after obtaining the item of target aggregated content, if the searching user is interested in one or more items of aggregated content, and hopes to know about dynamic condition of the aggregating users corresponding to the one or more items of aggregated content, the searching user may follow the corresponding aggregating user through the following option. After the searching user follows the aggregating user, the aggregating user only needs to upload the item of aggregated content to the server, and the sever pushes the item of aggregated content to the searching user who follows the aggregating user in time. With the way of pushing the item of aggregated content in time, the item of aggregated content that the searching user follows may be pushed timely and efficiently, and the searching user does not need to perform massive searching from a plurality of items of aggregated content based on own needs.

Figure 4B:
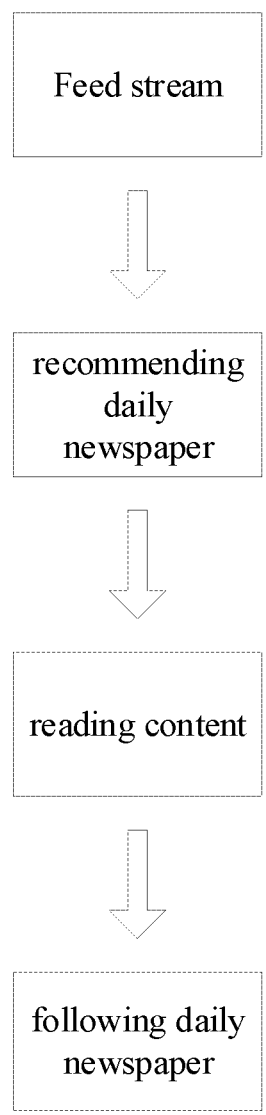
FIG. 4b is a schematic diagram illustrating reading aggregated content and following an aggregating user provided in embodiment four of the present disclosure.

FIG. 4b is a schematic diagram illustrating reading aggregated content and following an aggregating user provided in embodiment four of the present disclosure. As illustrated in FIG. 4b, the item of aggregated content of the aggregating user is taken as a daily newspaper similarly. The server may recommend the daily newspaper to the searching user by Feed stream, and the searching user reads the daily newspaper recommended by the server. The searching user may follow the daily newspaper when the searching user considers that pieces of content in the daily newspaper is a hot spot focused by himself, to obtain subsequent daily newspaper sent by the aggregating user corresponding to the daily newspaper continuously.

Figure 4C:
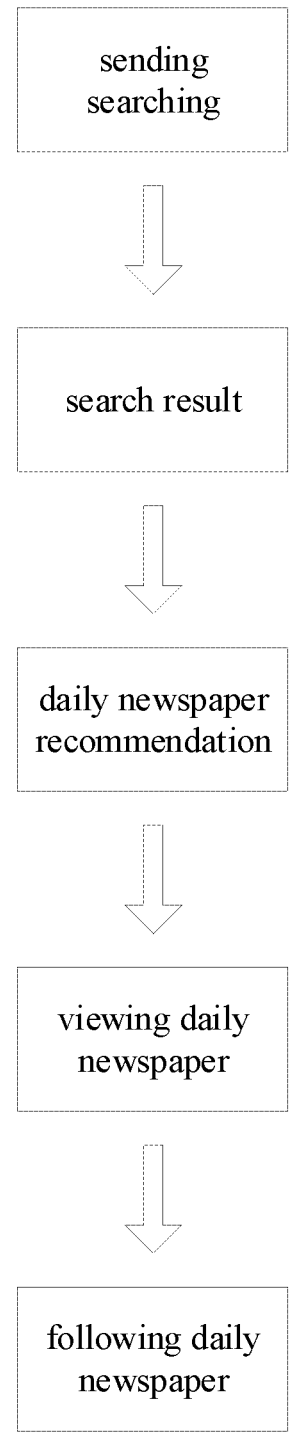
FIG. 4c is a schematic diagram illustrating reading aggregated content and following an aggregating user provided in embodiment four of the present disclosure.

FIG. 4c is a schematic diagram illustrating reading aggregated content and following an aggregating user provided in embodiment four of the present disclosure. As illustrated in FIG. 4c, the item of aggregated content of the aggregating user is taken as daily newspaper similarly. The server may send a search result to the searching user based on the search request of the searching user when the searching user initiates the search request of the piece of content through the application in the terminal. The search result includes the daily newspaper matching with the search request of the searching user, and the searching user may read and follow based on the daily newspaper recommended by the server.

In block S460, a choice of the searching user for at least two pieces of content included in the item of target aggregated content is obtained.

In embodiments of the present disclosure, although the searching user obtains the item of aggregated content, the searching user needs to read respective pieces of content included in the item of aggregated content one by one. The server may obtain the choice of the searching user for the piece of content when the searching user reads certain piece of content in the item of aggregated content.

In block S470, when it is determined that the aggregating user of the item of target aggregated content comments at least one of at least two pieces of content included in the item of target aggregated content, corresponding comment text is highlighted in a content display webpage of the corresponding piece of content.

In embodiments of the present disclosure, if the item of content chosen by the searching user includes the comment text of the aggregating user, in order to attract the attention of the searching user, the comment text may be highlighted. For example, the highlighting may be completed by highlighting a mark on the text, by providing a small animation beside the comment text, or by employing some ways which may highlight the comment text, which is not limited in embodiments of the present disclosure. Highlighting the comment text may enable the searching user to know about the understanding of the aggregating user for the piece of current content quickly.

It should be noted that, in addition to that the aggregating user may input the comment text for the piece of content, the searching user also may input corresponding comment text when reading the item of target content. Similarly, the comment text of the searching user may be input in a plurality of content forms such as text, expression, picture, voice, video, which is not limited in embodiments of the present disclosure.

In block S480, other item of aggregated content uploaded by an aggregating user of the item of target aggregated content is obtained.

In embodiments of the present disclosure, when providing the item of target aggregated content matching with the search request for the searching use, the server may further provide other item of aggregated content uploaded by the aggregating user of the item of target aggregated content for the searching user. The server may automatically provide the item of aggregated content for the searching user by the way of pushing the aggregated content. Even when the searching user does not follow the aggregating user, several pieces of aggregated content uploaded by the aggregating user in recent or consecutive months may further be obtained, such that the searching user further knows about the attention of the aggregating user, to enable the searching users to determine the aggregating user who they need, or like-minded.

In block S490, the other item of aggregated content is provided for the searching user.

In embodiments of the present disclosure, providing the other item of aggregated content for the searching user may extend the using value of the aggregated content. The aggregating user may further upload advertisement or other commercial content by the way of aggregated content when the aggregated content of the aggregating user is followed by a large amount of the searching user, such that the searching user receives related commercial content while obtaining the aggregated content, to improve the commercial value of pushing the aggregated content With the embodiment of the present disclosure, by sorting the items of target aggregated content matching with the searching user, highlighting the comment text included in the item of target aggregated content, and providing other item of aggregated content of the aggregating user of the item of target aggregated content for the searching user, unicity and limitation of content provided for the searching user in the related art are solved, further improving the recommendation function of aggregated content, improving efficiency and timeliness of content recommendation and reduce labor cost, breaking through limitation caused by manually collecting content, and enhancing commercial value.

Embodiment Five

Figure 5:
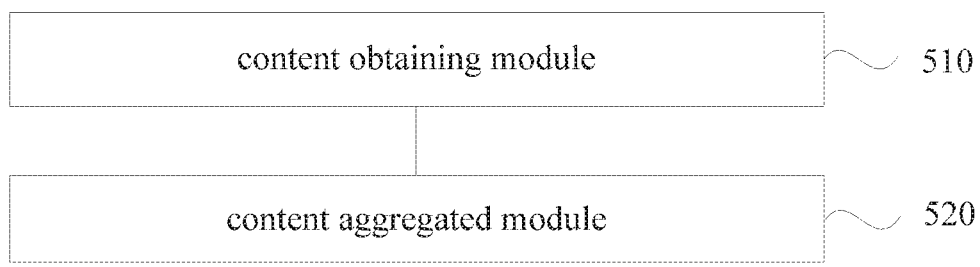
FIG. 5 is a block diagram illustrating a device for generating aggregated content provided in embodiment five of the present disclosure.

FIG. 5 is a block diagram illustrating a device for generating aggregated content provided in embodiment five of the present disclosure. The device may execute the method for generating aggregated content provided in any above embodiment of the present disclosure. The device may have function modules and beneficial effects for executing the methods. The embodiment may be applicable to a case of forming the aggregated content based on pieces of obtained content. The device includes a content obtaining module 510 and a content aggregating module 520.

The content obtaining module 510 is configured to obtain at least two pieces of content chosen by an aggregating user as at least two items of recommendation content to be aggregated.

The content aggregating module 520 is configured to combine the at least two items of recommendation content to be aggregated based on a content aggregating request of the aggregating user to obtain the aggregated content, and upload the aggregated content to a server. The aggregated content is configured as recommendation content to provide for other users by the server.

With the embodiments of the present disclosure, by obtaining the at least two pieces of content chosen by the aggregating user as the at least two items of recommendation content to be aggregated, combining the at least two items of recommendation content to be aggregated based on the content aggregating request of the aggregating user to obtain the aggregated content, and uploading the aggregated content to the server, some problems in the existing content recommendation such as labor cost, low efficiency, poor timeliness and limitation are solved. The aggregated content in time is recommended for the user from a plurality of interest dimensions, which extends dimensions of content, improves efficiency and timeliness of content recommendation, reduces labor cost, breaks through limitation caused by manually collecting content, and enhances commercial value.

Alternatively, the device further includes a first content providing module 530. The first content providing module 530 is configured to obtain description text of at least one piece of content from the server to provide for the aggregating user; provide a piece of content matching with a content viewing request for the aggregating user from the at least one piece of content, and provide a content adding option corresponding to the piece of content matching with the content viewing request in a content display webpage. The content adding option is configured to trigger choosing the piece of content matching with the content viewing request as one item of recommendation content to be aggregated.

Alternatively, the device further includes a second content providing module 540. The second content providing module 540 is configured to obtain a piece of content matching with a webpage link input by the aggregating user from the server; provide the piece of content matching with the webpage link for the aggregating user, and provide the content adding option corresponding to the piece of content matching with the webpage link in the content display webpage. The content adding option is configured to trigger choosing the piece of content matching with the webpage link as one item of recommendation content to be aggregated.

Alternatively, the content obtaining module 510 is further configured to obtain one piece of content chosen by the aggregating user as a piece of target content; determine an amount of items of recommendation content to be aggregated currently stored in an aggregated content template; when the amount of items of recommendation content does not reach a storage limit of the aggregated content template, take the piece of target content as one item of recommendation content to be aggregated to store into the aggregated content template; when the amount of items of recommendation content reaches the storage limit of the aggregated content template, prompt the aggregating user to give up choosing the piece of target content as one item of recommendation content to be aggregated, or to use the piece of target content to replace any one of the items of recommendation content to be aggregated stored in the aggregated content template currently, and update the aggregated content template based on an operation executed by the aggregating user for promoting.

Alternatively, the device further includes a content obtaining module 540. The content obtaining module 540 is configured to obtain comment text input by the aggregating user for at least one item of recommendation content to be aggregated stored in the aggregated content template; and/or obtain a sequence adjustment request input by the aggregating user for the at least two items of recommendation content to be aggregated stored in the aggregated content template, and update the storage sequence of respective item of recommendation content to be aggregated in the aggregated content template based on the sequence adjustment request.

Alternatively, the content aggregating module 520 is further configured to combine the at least two items of recommendation content to be aggregated stored in the aggregated content template based on the content aggregating request of the aggregating user, to obtain the aggregated content; and add an identifier of the aggregating user into the aggregated content, and uploading the aggregated content with the identifier of the aggregating user to the server.

The above device for generating the aggregated content may execute the method for generating the aggregated content provided in any above embodiment of the present disclosure, and has the corresponding function modules and beneficial effects of executing the method. Technical details not described in detail in the embodiment may refer to the method for generating the aggregated content provided in any above embodiment of the present disclosure.

Embodiment Six

Figure 6:
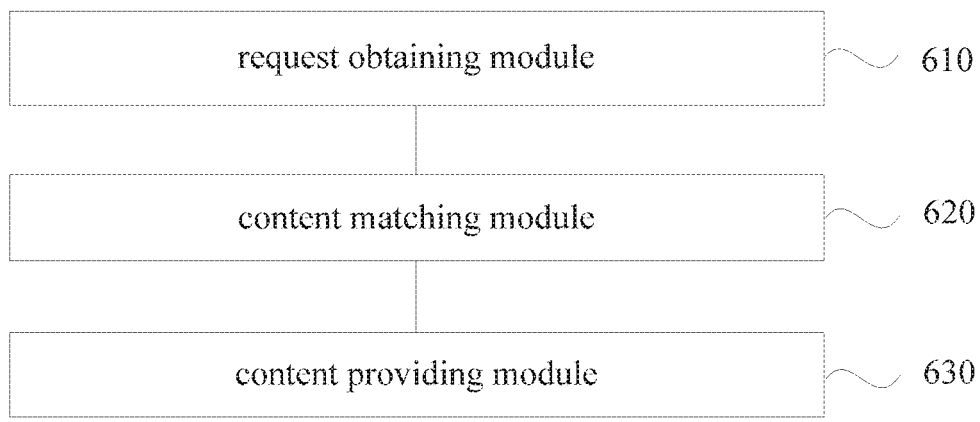
FIG. 6 is a block diagram illustrating a device for pushing aggregated content provided in embodiment six of the present disclosure.

FIG. 6 is a block diagram illustrating a device for pushing aggregated content provided in embodiment six of the present disclosure. The device may execute the method for pushing the aggregated content provided in any above embodiment of the present disclosure. The device has the corresponding function modules and beneficial effects of executing the method. The embodiment may be applicable to a case of pushing the aggregated content to a user. The device includes a request obtaining module 610, a content matching module 620 and a content providing module 630.

The request obtaining module 610 is configured to obtain a search request of a searching user.

The content matching module 620 is configured to match the search request with at least one item of aggregated content to obtain an item of target aggregated content. One item of aggregated content includes at least two pieces of content.

The content providing module 630 is configured to take the item of target aggregated content as a search result to provide for the searching user.

With the embodiments of the present disclosure, by providing the item of target aggregated content including the at least two pieces of content for the search request of the searching user, the content limitation problems resulting from the manual content collection, aggregation, and issuing of the editor in the related art are solved, improving efficiency and timeliness of content recommendation, reducing labor cost, breaking through limitation caused by manually collecting content, and enhancing commercial value.

Alternatively, the content matching module 620 is further configured to match respective pieces of content included in the at least one item of aggregated content with the search request to obtain at least one item of alternative aggregated content; generate a user level based on the at least one item of alternative aggregated content, and sort the at least one item of alternative aggregated content based on the user level; and obtain the item of target aggregated content based on a sorting result of the at least one item of alternative aggregated content.

Alternatively, the device further includes a content display module 640. The content display module 640 is configured to obtain a choice of the searching user for at least two pieces of content included in the item of target aggregated content; and highlight corresponding comment text in a content display webpage of the corresponding piece of content when it is determined that an aggregating user of the item of target aggregated content comments at least one of at least two pieces of content included in the item of target aggregated content.

Alternatively, the device further includes a third content providing module 650. The third content providing module 650 is configured to obtain other item of aggregated content uploaded by an aggregating user of the item of target aggregated content; and provide the other item of aggregated content to the searching user.

Alternatively, the device further includes an option providing module 660. The option providing module 660 is configured to provide following option of an aggregating user of the item of target aggregated content to the searching user; in which, the following option is configured to trigger the searching user to follow the aggregating user, to obtain aggregated content in real time uploaded by the aggregating user.

The device for pushing the aggregated content above may execute the method for pushing the aggregated content provided in any above embodiment of the present disclosure, and has the corresponding function modules and beneficial effects of executing the method. Technical details not described in detail in the embodiment may refer to the method for generating aggregated content provided in any above embodiment of the present disclosure.

Embodiment Seven

Figure 7:
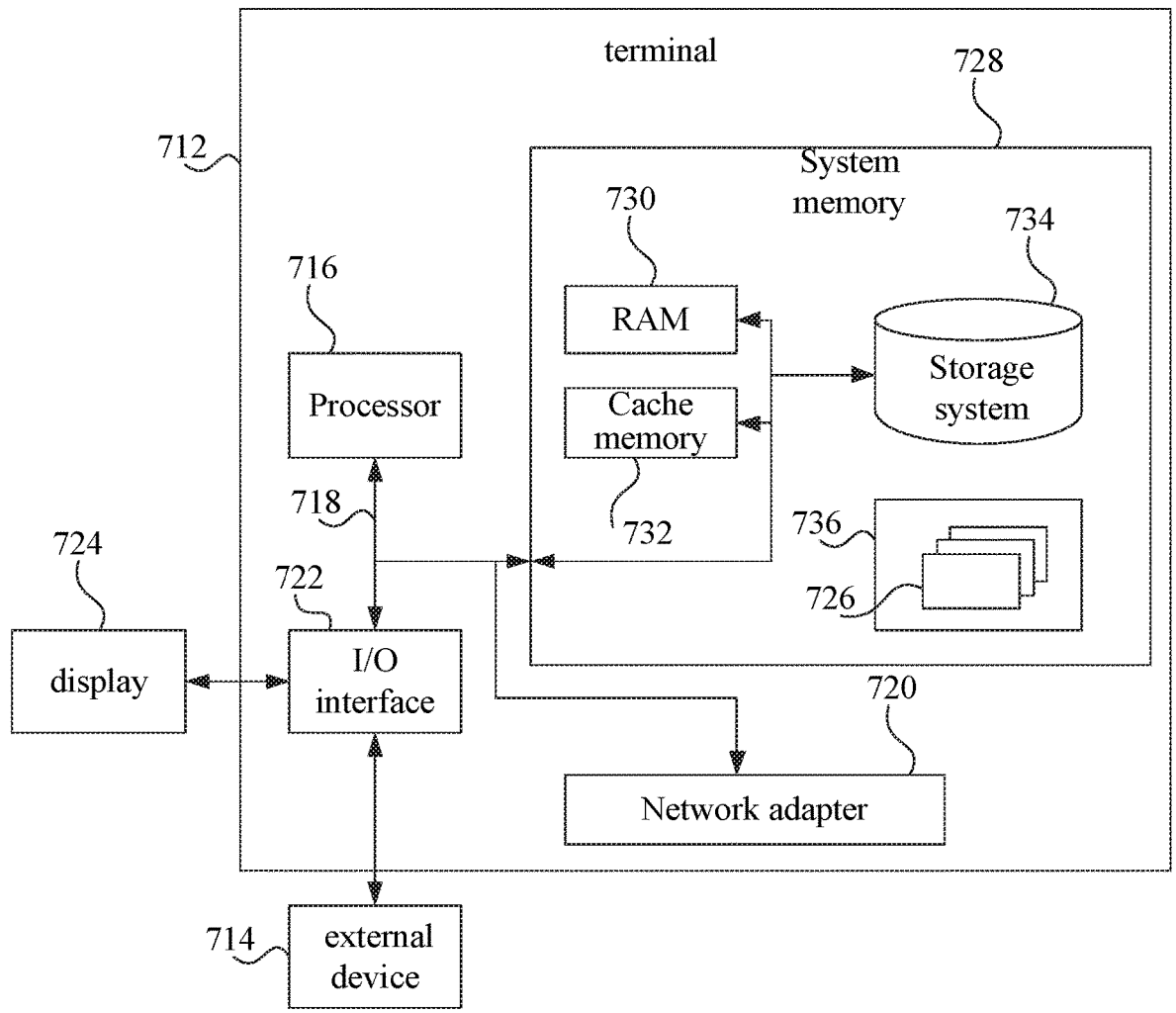
FIG. 7 is a block diagram illustrating a terminal provided in embodiment seven of the present disclosure.

FIG. 7 is a block diagram illustrating a terminal provided in embodiment seven of the present disclosure. FIG. 7 illustrates the block of the terminal 712 applicable to implement embodiments of the present disclosure. The terminal 712 illustrated in FIG. 7 is only an example, which may not bring any limitation for functions and scope of embodiments of the present disclosure.

As illustrated in FIG. 7, the terminal 712 is embodied in the form of a general-purpose computer device. Assemblies of the terminal 712 may include but not limit to: one or more processors 716, a storage device 728, and a bus 718 connecting different system assemblies (including the storage device 728 and a processor 716).

The bus 718 represents one or more of several bus structures, including a storage bus or a storage controller, a peripheral bus, a circular accelerating port and a processor or a local bus with any bus structure in various bus structures. For example, these architectures include but not limit an ISA (Industry Standard Architecture) bus, a MAC (Micro Channel Architecture) bus, an enhancing ISA bus, a VESA (Video Electronics Standards Association) local bus and a PCI (Peripheral Component Interconnection) bus.

The terminal 712 typically includes various computer system readable mediums. These mediums may be any usable medium that may be accessed by the terminal 712, including volatile mediums and non-volatile mediums, removable and non-removable mediums.

The storage device 728 may include computer system readable mediums with the form of the volatile mediums, such as a RAM (Random Access Memory) 730 and/or a cache memory 732. The terminal 712 may further include other removable/non-removable, volatile/non-volatile computer system storage mediums. Only as an example, the storage system 734 may be configured to read and write non-removable, non-volatile magnetic mediums (not illustrated in FIG. 7, which is usually called "a hard disk driver"). Although not illustrated in FIG. 7, the storage system 734 may provide a hard disk driver configured to read and write the removable non-volatile magnetic disc (such as "a diskette"), and a disc driver configured to read and write a removable non-volatile disc (such as a CD-ROM (Compact Disc Read Only Memory), a DVD-ROM (Digital Video Disc Read Only Memory) or other light mediums). Under these circumstances, each driver may be connected with the bus 718 by one or more data medium interfaces. The storage device 728 may include at least one program product, the program product has a set of program modules (such as at least one), and these program modules are configured to execute functions of each embodiment of the present disclosure.

A program/utility 712, having a set (at least one) of program modules 726, may be stored in storage device 728 by way of example, and not limitation, as well as an operating system, one or more application programs, other program modules, and program data. Each of examples may include an implementation of a networking environment. The program module 726 usually executes functions and/or methods described in embodiments of the present disclosure.

The terminal 712 may communicate with one or more external apparatuses 714 (such as a keyboard, a pointing device, a display 724), further may communicate with one or more devices enabling a user to interact with the terminal 712, and/or may communicate with one or more other computer devices (such as a network card, modem). Such communication may occur via Input/Output (I/O) interface 722. And, the terminal 712 further may communicate with one or more networks (such as LAN (Local Area Network), WAN (Wide Area Network) and/or public network, such as Internet) via a network adapter 720. As illustrated in FIG. 7, the network adapter 720 communicates with other modules of the terminal 712 via the bus 718. It should be understood that, although not illustrated in FIG. 7, other hardware and/or software modules may be used in combination with the computer device 712, including but not limited to: microcode, device drivers, redundant processing units, external disk drive arrays, RAID (Redundant Array of Independent Disks) systems, tape drives, and data archival storage systems, etc.

The processor 716, by operating programs stored in the storage device 728, executes various function applications and data processing, for example implementing a method for generating aggregated content provided in the above embodiments.

With the terminal, by obtaining the at least two pieces of content chosen by the aggregating user as the at least two items of recommendation content to be aggregated, combining the at least two items of recommendation content to be aggregated based on the content aggregating request of the aggregating user to obtain the aggregated content, and uploading the aggregated content to the server, some problems in the existing content recommendation such as labor cost, low efficiency, poor timeliness and limitation are solved. The aggregated content in time is recommended for the user from a plurality of interest dimensions, which extends dimensions of content, improves efficiency and timeliness of content recommendation, reduces labor cost, breaks through limitation caused by manually collecting content, and enhances commercial value.

Embodiment Eight

Figure 8:
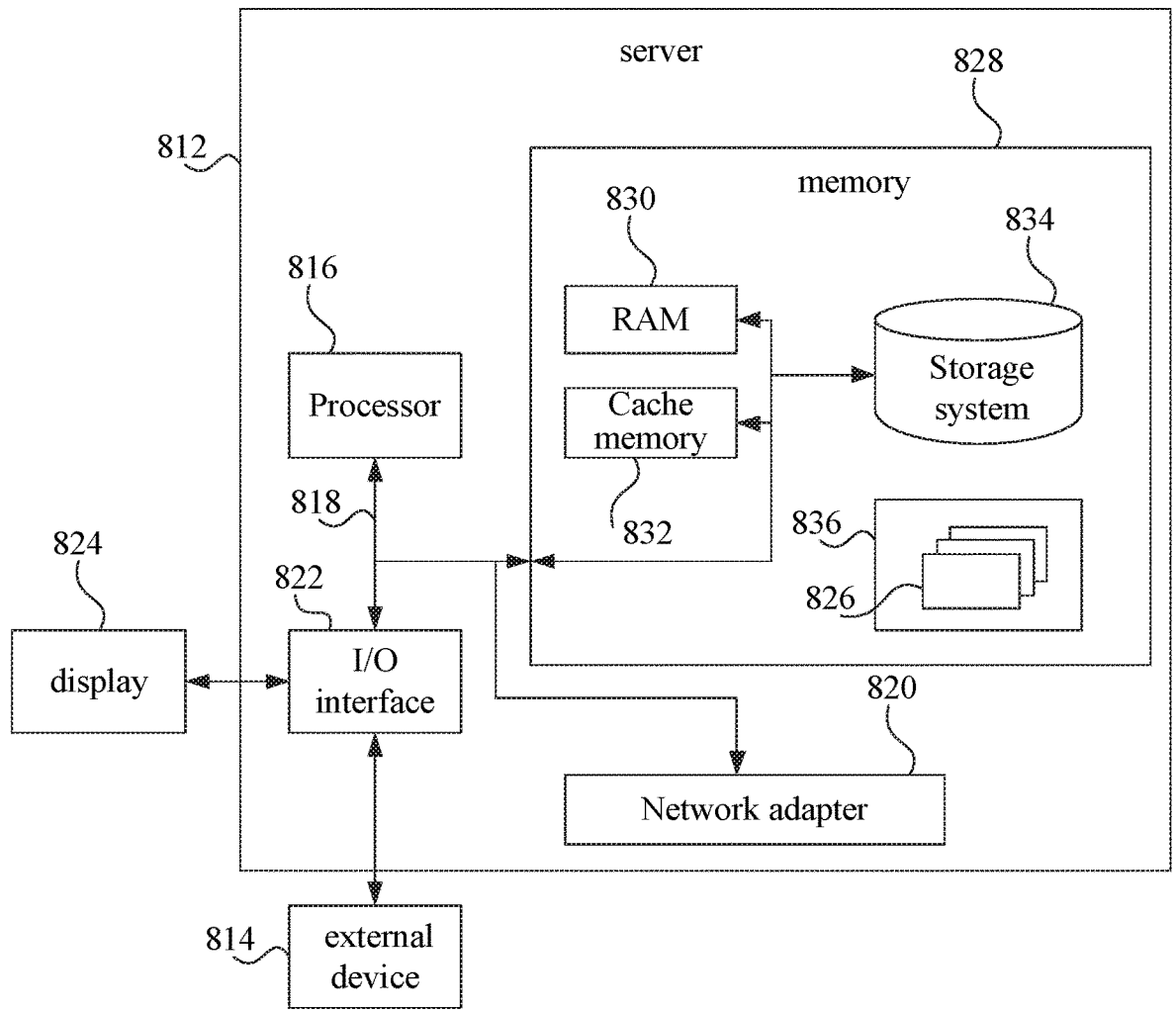
FIG. 8 is a block diagram illustrating a server provided in embodiment eight of the present disclosure.

FIG. 8 is a block diagram illustrating a server provided in embodiment eight of the present disclosure. FIG. 8 illustrates the block of a server 812 applicable to implement embodiments of the present disclosure. The server 812 illustrated in FIG. 8 is only an example, which may not bring any limitation for functions and scope of embodiments of the present disclosure.

As illustrated in FIG. 8, the server 812 is embodied in the form of a general-purpose computer device. Assemblies of the server 812 may include but not limit: one or more processors 816, a storage device 828, and a bus 818 connecting different system assemblies (including the storage device 828 and a processor 816).

The bus 818 represents one or more of several bus structures, including a storage bus or a storage controller, a peripheral bus, a circular accelerating port and a processor or a local bus with any bus structure in various bus structures. For example, these architectures include but not limit an ISA (Industry Standard Architecture) bus, a MAC (Micro Channel Architecture) bus, an enhancing ISA bus, a VESA (Video Electronics Standards Association) local bus and a PCI (Peripheral Component Interconnection) bus.

The server 812 typically includes various computer system readable mediums. These mediums may be any usable medium that may be accessed by the terminal 812, including volatile mediums and non-volatile mediums, removable and non-removable mediums.

The storage device 828 may include computer system readable mediums with the form of the volatile mediums, such as a RAM (Random Access Memory) 830 and/or a cache memory 832. The server 812 may further include other removable/non-removable, volatile/non-volatile computer system storage mediums. Only as an example, the storage system 834 may be configured to read and write non-removable, non-volatile magnetic mediums (not illustrated in FIG. 8, which is usually called "a hard disk driver"). Although not illustrated in FIG. 8, the storage system 834 may provide a hard disk driver configured to read and write the removable non-volatile magnetic disc (such as "a diskette"), and a disc driver configured to read and write a removable non-volatile disc (such as a CD-ROM (Compact Disc Read Only Memory), a DVD-ROM (Digital Video Disc Read Only Memory) or other light mediums). Under these circumstances, each driver may be connected with the bus 818 by one or more data medium interfaces. The storage device 828 may include at least one program product, the program product has a set of program modules (such as at least one), and these program modules are configured to execute functions of each embodiment of the present disclosure.

A program/utility 812, having a set (at least one) of program modules 826, may be stored in storage device 828 by way of example, and not limitation, as well as an operating system, one or more application programs, other program modules, and program data. Each of examples may include an implementation of a networking environment. The program module 826 usually executes functions and/or methods described in embodiments of the present disclosure.

The server 812 may communicate with one or more external apparatuses 814 (such as a keyboard, a pointing device, a display 824), further may communicate with one or more devices enabling a user to interact with the server 812, and/or may communicate with one or more other computer devices (such as a network card, modem). Such communication may occur via Input/Output (I/O) interface 822. And, the terminal 812 further may communicate with one or more networks (such as LAN (Local Area Network), WAN (Wide Area Network) and/or public network, such as Internet) via a network adapter 820. As illustrated in FIG. 8, the network adapter 820 communicates with other modules of the server 812 via the bus 818. It should be understood that, although not illustrated in FIG. 8, other hardware and/or software modules may be used in combination with the server 812, including but not limited to:

microcode, device drivers, redundant processing units, external disk drive arrays, RAID (Redundant Array of Independent Disks) systems, tape drives, and data archival storage systems, etc.

The processor 816, by operating programs stored in the storage device 828, executes various function applications and data processing, for example implementing a method for pushing aggregated content provided in the above embodiments.

With the server, by providing the item of target aggregated content including the at least two pieces of content for the search request of the searching user, the content limitation problems resulting from the manual content collection, aggregation, and issuing of the editor in the related art are solved, improving efficiency and timeliness of content recommendation, reducing labor cost, breaking through limitation caused by manually collecting content, and enhancing commercial value.

Embodiment Nine

Embodiment nine of the present disclosure further provides a computer storage medium having stored a storage computer program. When executed by a computer processor, the computer program is configured to execute a method for generating aggregated content according to any of the above embodiments of the present disclosure.

The computer storage medium of embodiments of the present disclosure may employ any combination of one or more computer readable medium. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any of the above appropriate combinations. In this document, a computer readable storage medium can be any tangible medium that contains or stores a program. The program can be used by or in conjunction with an instruction execution system, apparatus or device.

The computer readable signal medium may include a data signal transmitted in the baseband or as part of a carrier, in which carries computer readable program codes. The data signal transmitted may employ a plurality of forms, including but not limited to an electromagnetic signal, a light signal or any suitable combination thereof. The computer readable signal medium may further be any computer readable medium other than the computer readable storage medium. The computer readable medium may send, broadcast or transmit programs configured to use or use in combination by an instruction executing system, an apparatus or a device.

The program codes included in computer readable medium may be transmitted by any appropriate medium, including but not limited to wireless, wired, cable, RF (Radio Frequency), etc., or any suitable combination of the foregoing.

The computer program codes for executing application operation may be programmed using one or more program languages or the combination thereof. The program languages include object-oriented programming languages, such as Java, Smalltalk, C++, further include conventional procedural programming languages, such as the C programming language or similar programming languages. The computer readable program code may execute entirely on the computer of the user, partly on the computer of the user, as a stand-alone software package, partly on the computer of the user and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiment Ten

Embodiment ten of the present disclosure further provides a computer storage medium having stored a storage computer program. When executed by a computer processor, the computer program is configured to execute a method for pushing aggregated content according to any of the above embodiments of the present disclosure.

The computer storage medium of embodiments of the present disclosure may employ any combination of one or more computer readable medium. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any of the above appropriate combinations. In this document, a computer readable storage medium can be any tangible medium that contains or stores a program. The program can be used by or in conjunction with an instruction execution system, apparatus or device.

The computer readable signal medium may include a data signal transmitted in the baseband or as part of a carrier, in which carries computer readable program codes. The data signal transmitted may employ a plurality of forms, including but not limited to an electromagnetic signal, a light signal or any suitable combination thereof. The computer readable signal medium may further be any computer readable medium other than the computer readable storage medium. The computer readable medium may send, broadcast or transmit programs configured to use or use in combination by an instruction executing system, an apparatus or a device.

The program codes included in computer readable medium may be transmitted by any appropriate medium, including but not limited to wireless, wired, cable, RF (Radio Frequency), etc., or any suitable combination of the foregoing.

The computer program codes for executing application operation may be programmed using one or more program languages or the combination thereof. The program languages include object-oriented programming languages, such as Java, Smalltalk, C++, further include conventional procedural programming languages, such as the C programming language or similar programming languages. The computer readable program code may execute entirely on the computer of the user, partly on the computer of the user, as a stand-alone software package, partly on the computer of the user and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It should be noted that the above are only preferred embodiments of the present disclosure and the applicable technical principles. The skilled in the related art may understand that, the present disclosure does not limit to the specific embodiments described herein. Various apparent changes, adjustment and substitutions can be made to the present disclosure without departing from the spirit and scope of the present disclosure for the skilled in the related art. Therefore, although detailed illustration is made to the present disclosure based on the foregoing embodiments, the present disclosure is not only limited to the foregoing embodiments. More equivalent embodiments may be further included without departing from the scope of conception of the present disclosure, and the scope of the present disclosure is determined by the claims that follow.

What is claimed is:
1. A method for generating aggregated content, applicable to a terminal, and comprising:
   providing a user interface for displaying a list of pieces of content;
   obtaining at least two pieces of content chosen by an aggregating user from the list, comprising: obtaining one piece of content chosen by the aggregating user from the list as a piece of target content; determining an amount of pieces of content currently stored in an aggregated content template; when the amount does not reach a storage limit of the aggregated content template, storing the piece of target content into the aggregated content template; and when the amount reaches the storage limit of the aggregated content template, prompting the aggregating user to give up storing the piece of target content into the aggregated content template, or to use the piece of target content to replace any one pieces of content stored in the aggregated content template currently, and updating the aggregated content template based on an operation executed by the aggregating user for promoting;
   receiving a content aggregating request input by the aggregating user on the user interface;
   combining the at least two pieces of content based on the content aggregating request, to obtain the aggregated content; and
   uploading the aggregated content to a server based on an updating request input by the aggregating user on the user interface, wherein, the aggregated content is configured as recommendation content to provide for other users by the server.

2. The method according to claim 1, further comprising:
obtaining description text of at least one piece of content in the list from the server;
providing a viewing option for the description text on the user interface;
receiving a content viewing request when the aggregating user clicks the viewing option;
providing a piece of content corresponding to the content viewing request; and
providing a content adding option corresponding to the piece of content corresponding to the content viewing request in a content display webpage of the user interface,
wherein the content adding option is configured to trigger choosing the piece of content corresponding to the content viewing request.

3. The method according to claim 1, further comprising:
obtaining a piece of content matching with a webpage link input by the aggregating user from the server;
providing the piece of content matching with the webpage link for the aggregating user in the user interface; and
providing a content adding option corresponding to the piece of content matching with the webpage link in a content display webpage of the user interface,
wherein the content adding option is configured to trigger choosing the piece of content matching with the webpage link.

4. The method according to claim 1, further comprising:
obtaining comment text input by the aggregating user for at least one piece of content stored in the aggregated content template; and/or
obtaining a sequence adjustment request input by the aggregating user for at least two pieces of content stored in the aggregated content template, and updating a storage sequence of respective pieces of content in the aggregated content template based on the sequence adjustment request.

5. The method according to claim 4, wherein obtaining the sequence adjustment request, comprises:
obtaining the sequence adjustment request when the aggregating user drags the at least two pieces of content stored in the aggregated content template, or
obtaining the sequence adjustment request when the aggregating user inputs a speech instruction.

6. The method according to claim 1,
wherein, combining the at least two pieces of content, comprises:
combining the at least two pieces of content stored in the aggregated content template;
wherein, uploading the aggregated content to the server, comprises:
adding an identifier of the aggregating user into the aggregated content, and uploading the aggregated content with the identifier of the aggregating user to the server.

7. A terminal, comprising:
one or more processors;
a storage device, configured to store one or more programs;
when the one or more programs are executed by the one or more processors, the one or more processors implement a method for generating aggregated content, the method comprising:

providing a user interface for displaying a list of pieces of content;
obtaining at least two pieces of content chosen by an aggregating user from the list comprising: obtaining one piece of content chosen by the aggregating user from the list as a piece of target content determining an amount of pieces of content currently stored in an aggregated content template; when the amount does not reach a storage limit of the aggregated content template, storing the piece of target content into the aggregated content template; when the amount reaches the storage limit of the aggregated content template, prompting the aggregating user to give up storing the piece of target content into the aggregated content template, or to use the piece of target content to replace any one pieces of content stored in the aggregated content template currently, and updating the aggregated content template based on an operation executed by the aggregating user for promoting;
receiving a content aggregating request input by the aggregating user on the user interface;
combining the at least two pieces of content based on the content aggregating request, to obtain the aggregated content; and
uploading the aggregated content to a server based on an updating request input by the aggregating user on the user interface,
wherein, the aggregated content is configured as recommendation content to provide for other users by the server.

8. The terminal according to claim 7, wherein the method further comprises:
obtaining description text of at least one piece of content in the list from the server;
providing a viewing option for the description text on the user interface;
receiving a content viewing request when the aggregating user clicks the viewing option;
providing a piece of content corresponding to the content viewing request; and
providing a content adding option corresponding to the piece of content corresponding to the content viewing request in a content display webpage of the user interface,
wherein the content adding option is configured to trigger choosing the piece of content corresponding to the content viewing request.

9. The terminal according to claim 7, wherein the method further comprises:
obtaining a piece of content matching with a webpage link input by the aggregating user from the server;
providing the piece of content matching with the webpage link for the aggregating user in the user interface; and
providing a content adding option corresponding to the piece of content matching with the webpage link in a content display webpage of the user interface,
wherein the content adding option is configured to trigger choosing the piece of content matching with the webpage link.

10. The terminal according to claim 7, wherein, the method further comprises:
obtaining comment text input by the aggregating user for at least one piece of content stored in the aggregated content template; and/or
obtaining a sequence adjustment request input by the aggregating user for at least two pieces of content stored in the aggregated content template, and updating a storage sequence of respective pieces of content in the aggregated content template based on the sequence adjustment request.

11. The terminal according to claim 10, wherein obtaining the sequence adjustment request, comprises:
    obtaining the sequence adjustment request when the aggregating user drags the at least two pieces of content stored in the aggregated content template, or
    obtaining the sequence adjustment request when the aggregating user inputs a speech instruction.

12. The terminal according to claim 7,
    wherein, combining the at least two pieces of content, comprises:
    combining the at least two pieces of content stored in the aggregated content template;
    wherein, uploading the aggregated content to the server, comprises:
    adding an identifier of the aggregating user into the aggregated content, and uploading the aggregated content with the identifier of the aggregating user to the server.

13. A non-transient computer storage medium having stored computer programs thereon, wherein, the programs are configured to be executed by a processor to implement a method for generating aggregated content, the method comprising:
    providing a user interface for displaying a list of pieces of content;
    obtaining at least two pieces of content chosen by an aggregating user from the list, comprising: obtaining one piece of content chosen by the aggregating user from the list as a piece of target content determining an amount of pieces of content currently stored in an aggregated content template; when the amount does not reach a storage limit of the aggregated content template, storing the piece of target content into the aggregated content template; and when the amount reaches the storage limit of the aggregated content template, prompting the aggregating user to give up storing the piece of target content into the aggregated content template, or to use the piece of target content to replace any one pieces of content stored in the aggregated content template currently, and updating the aggregated content template based on an operation executed by the aggregating user for promoting;
    receiving a content aggregating request input by the aggregating user on the user interface;
    combining the at least two pieces of content based on the content aggregating request, to obtain the aggregated content; and
    uploading the aggregated content to a server based on an updating request input by the aggregating user on the user interface,
    wherein, the aggregated content is configured as recommendation content to provide for other users by the server.

14. The storage medium according to claim 13, wherein the method further comprises:
    obtaining description text of at least one piece of content in the list from the server;
    providing a viewing option for the description text on the user interface;
    receiving a content viewing request when the aggregating user clicks the viewing option;
    providing a piece of content corresponding to the content viewing request; and
    providing a content adding option corresponding to the piece of content corresponding to the content viewing request in a content display webpage of the user interface,
    wherein the content adding option is configured to trigger choosing the piece of content corresponding to the content viewing request.

15. The storage medium according to claim 13, wherein the method further comprises:
    obtaining a piece of content matching with a webpage link input by the aggregating user from the server;
    providing the piece of content matching with the webpage link for the aggregating user in the user interface; and
    providing a content adding option corresponding to the piece of content matching with the webpage link in a content display webpage of the user interface,
    wherein the content adding option is configured to trigger choosing the piece of content matching with the webpage link.

16. The storage medium according to claim 13, wherein, the method further comprises:
    obtaining comment text input by the aggregating user for at least one piece of content stored in the aggregated content template; and/or
    obtaining a sequence adjustment request input by the aggregating user for at least two pieces of content stored in the aggregated content template, and updating a storage sequence of respective pieces of content in the aggregated content template based on the sequence adjustment request.

17. The non-transient computer storage medium according to claim 16, wherein obtaining the sequence adjustment request, comprises:
    obtaining the sequence adjustment request when the aggregating user drags the at least two pieces of content stored in the aggregated content template, or
    obtaining the sequence adjustment request when the aggregating user inputs a speech instruction.

18. The storage medium according to claim 13,
    wherein, combining the at least two pieces of content, comprises:
    combining the at least two pieces of content stored in the aggregated content template;
    wherein, uploading the aggregated content to the server, comprises:
    adding an identifier of the aggregating user into the aggregated content, and uploading the aggregated content with the identifier of the aggregating user to the server.

* * * * *